United States Patent
Sato

(10) Patent No.: US 6,839,087 B1
(45) Date of Patent: Jan. 4, 2005

(54) EXPOSURE CONTROLLER OF A DIGITAL CAMERA

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 721 days.

(21) Appl. No.: 09/617,098

(22) Filed: Jul. 14, 2000

(30) Foreign Application Priority Data

Jul. 16, 1999 (JP) ............................................. 11-203249

(51) Int. Cl.[7] .............................................. H04N 5/235
(52) U.S. Cl. .................... 348/362; 348/229.1; 348/296; 348/297; 348/364; 348/370; 348/371
(58) Field of Search ............................. 348/229.1, 296, 348/297, 362, 364, 370, 371

(56) References Cited

U.S. PATENT DOCUMENTS

| | | | |
|---|---|---|---|
| 4,956,715 A | * | 9/1990 | Okino et al. ............. 348/230.1 |
| 5,473,375 A | * | 12/1995 | Takayama et al. .......... 348/364 |
| 5,541,645 A | * | 7/1996 | Davis ........................... 348/96 |
| 6,094,537 A | * | 7/2000 | Okazaki et al. ............. 396/127 |
| 6,426,775 B1 | * | 7/2002 | Kurokawa ................... 348/363 |

* cited by examiner

*Primary Examiner*—Andrew Christensen
*Assistant Examiner*—Brian Genco
(74) *Attorney, Agent, or Firm*—Greenblum & Bernstein, P.L.C.

(57) ABSTRACT

An exposure controller of a digital camera, using an image pick-up device, includes a photometering sensor, and a control device. The control device calculates a first exposure time in accordance with a photometering value obtained via the photometering sensor, and performs a pre-exposure in which a sensitive surface of the image pick-up device is exposed at a second exposure time shorter than the first exposure time. Thereafter, the control device performs a main exposure in which the sensitive surface of the image pick-up device is exposed at a third exposure time obtained by changing the value of one of the first exposure time and the second exposure time in accordance with a picture signal output from the image pick-up device, the picture signal being output when the image pick-up device is exposed at the second exposure time by the pre-exposure.

7 Claims, 3 Drawing Sheets

EXPOSURE CONTROLLER OF A DIGITAL CAMERA

BACKGROUND OF THE INVENTION

1. Field of the Invention

The present invention relates to an exposure controller of a digital camera, more specifically, to improving the pre-exposure operation in a digital camera which is performed to calculate an optimum exposure time (shutter speed) at which the main exposure is performed.

2. Description of the Related Art

Conventional digital cameras are provided with a CCD image sensor (image pick-up device) on which the image is captured. Since the dynamic range of the CCD image sensor is generally narrow, the shutter speed (charge accumulating time/exposure time) has to be precisely determined to capture a clear image. In order to determine the shutter speed precisely, a method of performing a pre-exposure before the main exposure is known in the art. Namely, an exposure calculation is performed to determine an optimum shutter speed in accordance with a picture signal obtained from the CCD image sensor by the pre-exposure. Note that in the main exposure, the image captured on the CCD image sensor is stored in a recording medium such as a memory.

In the case where the shutter speed for the pre-exposure is relatively slow due to lack of quantity of light from an object to be photographed, the time lag between the pre-exposure and the main exposure becomes large. As a result, electric power consumption necessary to keep holding each of the quick-return mirror, the shutter, and the diaphragm of the camera at a predetermined position increases, especially in a single-lens reflex electronic camera, which is not preferable.

SUMMARY OF THE INVENTION

The primary object of the present invention is to provide an exposure controller which makes it possible to reduce the time necessary for performing the pre-exposure before the main exposure to thereby reduce the time lag between the pre-exposure and the main exposure.

To achieve the object mentioned above, according to an aspect of the present invention, an exposure controller of a digital camera is provided, using an image pick-up device on which an image of an object to be photographed is captured, the exposure controller including a photometering sensor; and a control device. The control device calculates a first exposure time in accordance with a photometering value obtained via the photometering sensor, and performs a pre-exposure in which a sensitive surface of the image pick-up device is exposed at a second exposure time shorter than the first exposure time. Thereafter, the control device performs a main exposure in which the sensitive surface of the image pick-up device is exposed at a third exposure time obtained by changing the value of one of the first exposure time and the second exposure time in accordance with a picture signal output from the image pick-up device, the picture signal being output when the image pick-up device is exposed at the second exposure time by the pre-exposure.

Preferably, the digital camera is an SLR digital camera.

According to another aspect of the present invention, an exposure controller of a digital camera is provided, including a photometering sensor, and a control device. The control device performs an exposure operation to calculate a first exposure time in accordance with a photometering value obtained via the photometering sensor. The control device calculates a second exposure time shorter than the first exposure time in the case where the first exposure time is longer than a reference time duration. The control device performs a pre-exposure in which a sensitive surface of an image pick-up device of the digital camera is exposed at the second exposure time to calculate a brightness value in accordance with a picture signal which is output from the image pick-up device at the pre-exposure. The control device calculates a third exposure time which is to be used at a main exposure, in which the sensitive surface of the image pick-up device is exposed to obtain a picture signal which is to be stored in a memory, by changing the value of one of the first exposure time and the second exposure time in accordance with the calculated brightness value.

The reference time duration can be a predetermined flash synchronization speed (exposure time).

In an embodiment, the second exposure time is equal to the first exposure time divided by the Nth power of two ($2^N$)

In an embodiment, the control device calculates the third exposure time in accordance with an average of brightness values of all pixels of the image pick-up device which are obtained by the pre-exposure.

In an embodiment, the third exposure time is calculated by multiplying the second exposure time by an exposure compensation factor, wherein the exposure compensation factor is calculated by dividing a predetermined value by the average brightness value, and multiplying the result thereof by the Nth power of two ($2^N$).

In an embodiment, the reference time duration is a slowest exposure time which can just prevent an image formed on the sensitive surface of the image pick-up device from becoming blurry, caused by hand movement.

Preferably, the digital camera is an SLR digital camera.

According to another aspect of the present invention, an SLR digital camera includes a photometering sensor for measuring a object brightness, a CCD image sensor, a focal plane shutter positioned in front of the CCD image sensor, and a control device. The control device calculates a first exposure time in accordance with a photometering value obtained by the photometering sensor, and drives the focal plane shutter at a second exposure time shorter than the first exposure time. Furthermore, the control device subsequently drives the focal plane shutter at a third exposure time obtained by changing the value of one of the first exposure time and the second exposure time in accordance with a picture signal output from the CCD image sensor, the picture signal being output when the CCD image sensor is exposed at the second exposure time via the control device.

The present disclosure relates to subject matter contained in Japanese Patent Application No. 11-203249 (filed on Jul. 16, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
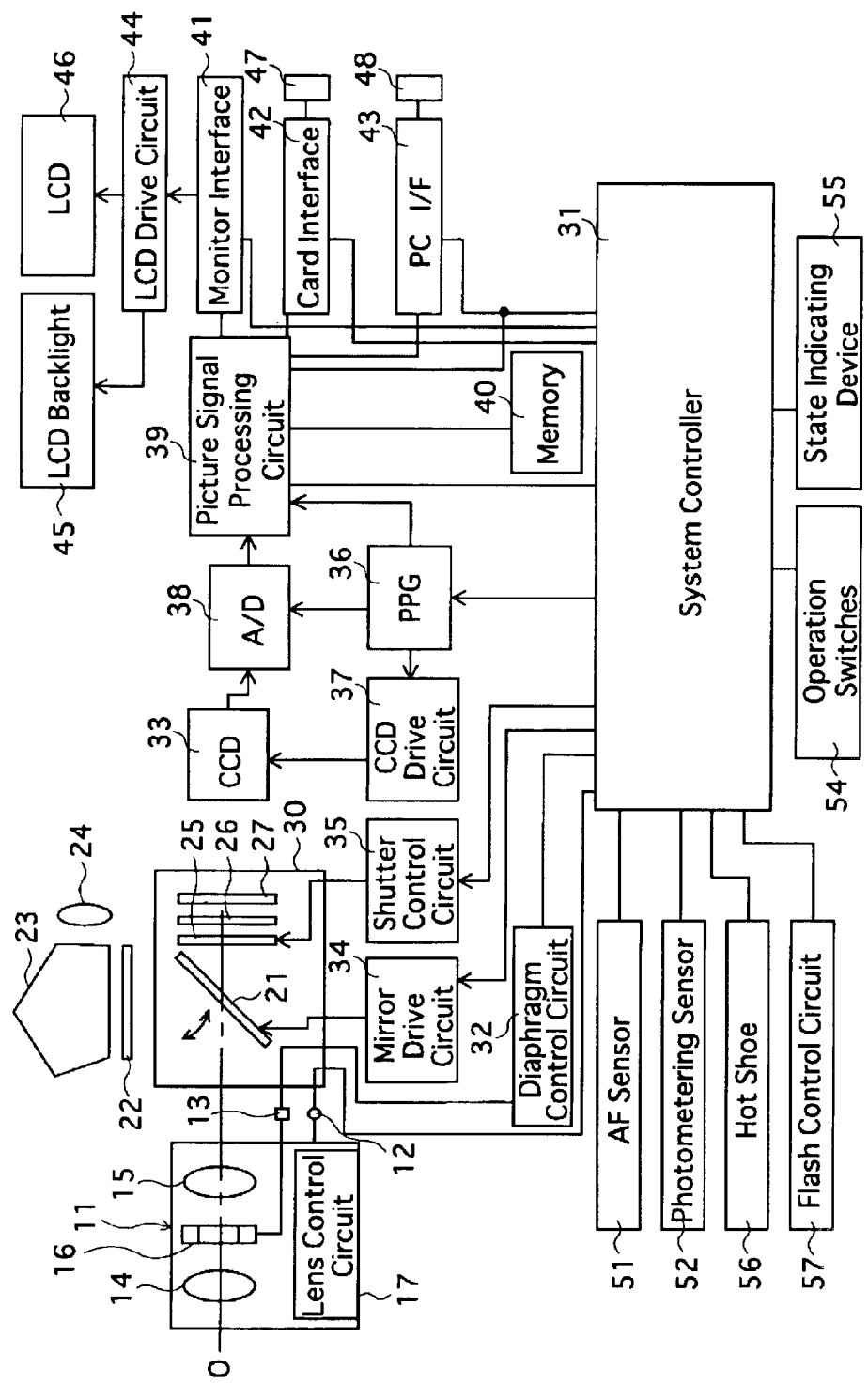
FIG. 1 is a block diagram of an embodiment of a digital camera having an exposure controller according to the present invention.

A digital camera whose essential elements are shown in the form of blocks in FIG. 1 is an embodiment of an SLR (Single-Lens Reflex) digital camera having an interchangeable lens 11 and a camera body (not shown) to which the interchangeable lens 11 is attached.

The interchangeable lens 11, attached to the camera body, is electrically connected to electrical circuits provided within the camera body via a set of electrical contacts 12 and a corresponding set of electrical contacts 13, which are formed on, e.g., each of a lens mount (lens mount ring) and a body mount (body mount ring) provided on the rear end of the interchangeable lens 11 and the front of the camera body, respectively.

The interchangeable lens 11 is provided therein with a front lens group 14 and a rear lens group 15. The interchangeable lens 11 is provided between the front lens group 14 and the rear lens group 15 with a diaphragm (iris diaphragm) 16. A lens control circuit 17 provided in the interchangeable lens 11 controls each of the front and rear lens groups 14 and 15 to move along an optical axis of the interchangeable lens 11 to adjust the focal point so as to bring a object into focus. The lens control circuit 17 operates in accordance with a control signal transmitted from a system controller (control device) 31 provided in the camera body via the electrical contacts 12. The diaphragm 16 operates to adjust the aperture size thereof in accordance with a control signal transmitted from a diaphragm control circuit 32 provided in the camera body via the electrical contacts 13. The diaphragm control circuit 32 is connected to the system controller 31 to be controlled thereby.

The camera body (a mirror box 30) is provided therein behind the front and rear lens groups 14 and 15 on the optical axis thereof with a quick-return mirror 21. The quick-return mirror 21 is rotatable between an inclined initial position (shown in FIG. 1) and a raised or retracted position (horizontal position). The camera body is provided above the quick-return mirror 21 with a focusing screen 22. The camera body is provided above the focusing screen 22 with a pentagonal prism (erecting prism) 23. The camera body is provided behind the pentagonal prism 23 with an eyepiece 24.

The camera body is provided behind the quick-return mirror 21 with a focal plane shutter 25. The camera body is provided behind the focal plane shutter 25 with a filter 26 for filtering infrared rays and an optical low-pass filter 27, in this order from the focal plane shutter 25. The camera body is provided behind the optical low-pass filter 27 with a CCD image sensor (image pick-up device) 33. Accordingly, the quick-return mirror 21, the focal plane shutter 25, the filter 26, the optical low-pass filter 27 and the CCD image sensor 33 are arranged in this order from the object side (i.e., from left to right as viewed in FIG. 1) on the optical axis O of the interchangeable lens 11.

The quick-return mirror 21 is driven to rotate by a mirror drive circuit 34 connected to the system controller 31, while the focal plane shutter 25 is driven to open and shut by a shutter control circuit 35 connected to the system controller 31. The mirror drive circuit 34 and the shutter control circuit 35 are each controlled by the system controller 31.

The quick-return mirror 21 is normally positioned in an inclined initial position shown in FIG. 1. The quick-return mirror 21 in the initial position reflects the incident light, which emerges from the rear end of the rear lens group 15 to enter the quick-return mirror 21, upwardly towards the pentagonal prism 23. At this time the focal plane shutter 25 is closed to close a light path which leads light to the sensitive surface of the CCD image sensor 33. On the other hand, when a picture is taken (when a photographic operation is undertaken), the quick-return mirror 21 is driven to swing up to the raised position thereof by the mirror drive circuit 34 to retreat from an optical path between the rear lens group 15 and the focal plane shutter 25. Immediately after the quick-return mirror 21 is completely raised, the focal plane shutter 25 is driven to open by the shutter control circuit 35, so that the light which enters into the camera body via the interchangeable lens 11 is incident on the sensitive surface of the CCD image sensor 33 via the filter 26 and the optical low-pass filter 27. Therefore, an image is formed on the sensitive surface of the CCD image sensors 33 via the front and rear lens groups 14 and 15, so that the CCD image sensor 33 converts light incident on the sensitive surface thereof into an electrical signal which corresponds to the image formed on the sensitive surface of the CCD image sensor 33.

A pulse-signal pattern generator (PPG) 36 is connected to the system controller 31. The system controller 31 controls the pulse-signal pattern generator 36 to generate various types of pulse signals. In accordance with these pulse signals, a CCD drive circuit 37, an A/D converter 38 and a picture signal processing circuit 39 are controlled. The operation of the CCD image sensor 33 is controlled by the CCD drive circuit 37. A picture signal read out of the CCD image sensor 33 is converted into a corresponding digital signal by the A/D converter 38. The picture signal processing circuit 39 receives the digital signal from the A/D converter 38 to give a predetermined image processing to the digital signal. A memory 40 (e.g., a flash memory), having a storing capacity that is a plurality of times the capacity necessary for storing a picture signal of a single picture frame (a single image), is connected to the picture signal processing circuit 39.

A monitor interface 41, a card interface 42 and a PC interface 43 are connected to the picture signal processing circuit 39. The interfaces 41, 42 and 43 are controlled by the system controller 31. An LCD backlight 45 and an LCD panel 46 are connected to the monitor interface 41 via an LCD drive circuit 44. The LCD drive circuit 44 is controlled in accordance with the picture signal read out from the memory 40 so that an image represented by the picture signal is indicated on the LCD panel 46. A card connector 47 and a PC connector 48 are connected to the card interface 42 and the PC interface 43, respectively. Removable IC memory card (e.g., a flash memory card) can be connected to the card connector 47. A personal computer can be detachably connected to the PC connector 48.

An AF sensor 51 and a photometering sensor 52 are connected to the system controller 31. The AF sensor 51 is a conventional type of AF sensor (e.g., a phase-difference detection type of AF sensor) for detecting an amount of defocus. The photometering sensor 52 measures the object brightness to determine an aperture size of the diaphragm 16 (i.e., an aperture value Av) and a charge accumulating time (a exposure time) for the CCD image sensor 33 which are used for the pre-exposure.

A set of operation switches 54 and a state indicating device 55 are connected to the system controller 31. The set of operation switches 54 include a photometering switch and a release switch (both not shown). The photometering switch is turned ON to make the photometering sensor operate immediately after a release button (not shown) of the digital camera is depressed half way down. Immediately after the release button is fully depressed, the release switch is turned ON the quick-return mirror 21 moved up, the focal plane shutter 25 operates (opens and shuts) at the set exposure time therefor, and thereafter the quick-return mirror 21 is moved down again. Consequently, the sensitive surface of the CCD image sensor 33 is exposed, so that it outputs a picture signal corresponding to the image formed on the sensitive surface of the CCD image sensor 33. The state indicating device 55 is provided with an LCD panel (not shown) which indicates various photographic information on the digital camera. The camera body of the digital camera is provided thereon with a hot shoe 56 to which an external flash can be attached. The camera body of the digital camera is provided therein with a flash control circuit 57 which controls the flash attached to the hot shoe 56. The flash control circuit 57 is controlled by the system controller 31.

Figure 2:
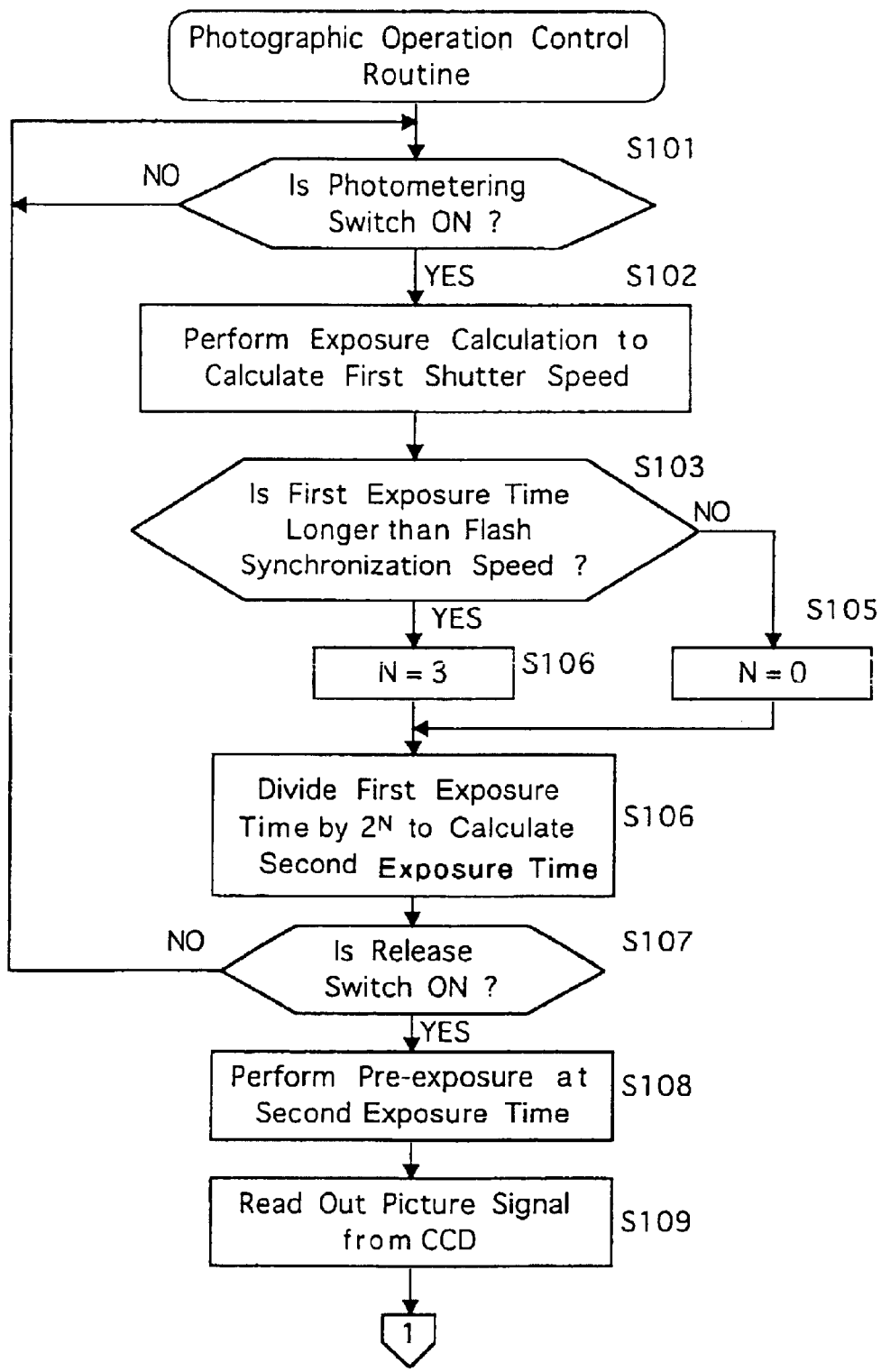
FIG. 2 is a flow chart showing the first half of a photographic operation control routine performed in the digital camera shown in FIG. 1.
Figure 3:
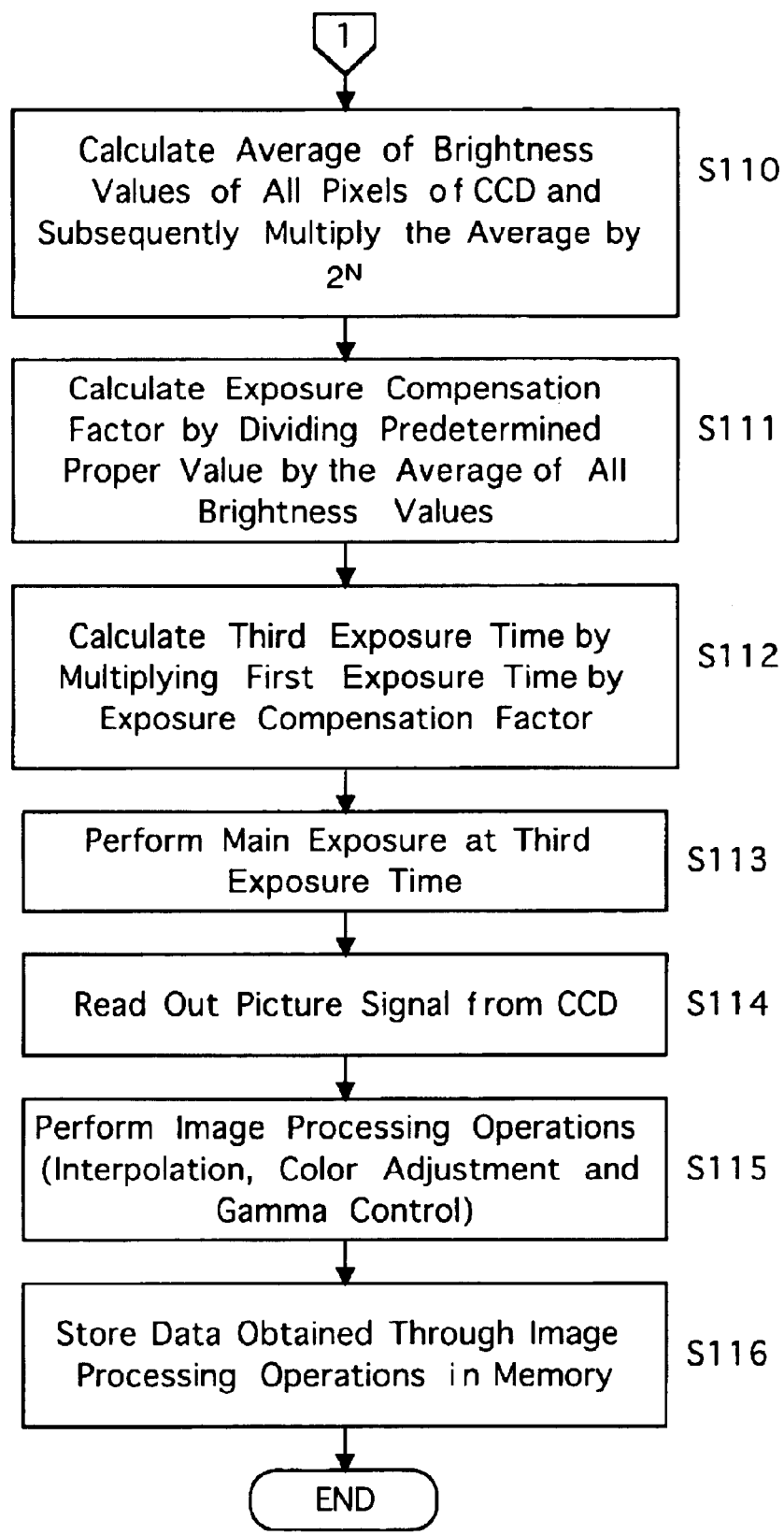
FIG. 3 is a flow chart showing the latter half of the photographic operation control routine.

FIGS. 2 and 3 show a flow chart showing a photographic operation control routine performed in the present embodiment of the SLR digital camera. In the following descriptions of the flow chart shown in FIGS. 2 and 3, in the pre-exposure operation and the main exposure operation, the quick-return mirror 21 is moved up, and the focal plane shutter 25 opens and closes at the set exposure time thereof. Accordingly, the sensitive surface of the CCD image sensor 33 is exposed, and thereafter, the quick-return mirror 21 is moved down.

Firstly it is determined at step S101 whether the photometering switch is ON. The operation at step S101 is repeatedly performed as long as the photometering switch is OFF. If the photometering switch is turned ON, an exposure calculation is performed at step S102. In the exposure calculation, the aperture size of the iris diaphragm 16 and a first exposure time are calculated in accordance with the photometering value obtained via the photometering sensor 52.

Subsequently, at step S103 it is determined whether the first exposure time calculated at step S102 is longer than a predetermined flash synchronization speed (e.g., 1/100 second). If it is determined that the first exposure time is longer than the flash synchronization speed, control proceeds to step S104 at which a parameter N is set at 3. If it is determined that the first exposure time is equal to or shorter than the flash synchronization speed, control proceeds to step S105 at which the parameter N is set at 0 (zero).

After the operation at step S104 or S105, control proceeds to step S106. At step S106 a second exposure time (a pre-exposure time) which is equal to the first exposure time divided by the Nth power of two ($2^N$) is calculated (wherein "N" represents the aforementioned parameter set at step S104 or step S105). Therefore, if the first exposure time is 1 second on condition that the flash synchronization speed is 1/100 second, the operation at step S104 is performed, so that the second exposure time is determined to be 1/8 second. If the first exposure time is 1/125 second on condition that the flash synchronization speed (exposure time) is 1/100 second, the operation at step S105 is performed, so that the second exposure time is determined to be 1/125 second (i.e. the first exposure time is same as the second exposure time).

Thereafter, it is determined at step S107 whether the release switch is ON. If it is determined that the release switch is not ON, control returns to step S101. If it is determined ON, control proceeds to step S108. At step S108 the pre-exposure is performed at the second exposure time to make the sensitive surface of the CCD image sensor 33 exposed. Subsequently, at step S109, the picture signal obtained by the pre-exposure is read out of the CCD image sensor 33. The CCD image sensor 33 is made up of thousands of individual photodiodes (also known as picture elements or pixels) arranged in a two-dimensional matrix (e.g., 600×400 matrix). A picture signal output from the CCD image sensor 33 is made up of pixel data obtained by each pixel of the CCD image sensor 33.

After the operation at step S109, control proceeds to step S110. At step S110, in the picture signal processing circuit 39, firstly the brightness value of each pixel of the CCD image sensor 33 is calculated in accordance with the pixel data obtained by the pixel of the CCD image sensor 33 and subsequently the average of all the calculated brightness values is multiplied by $2^N$ after the average is calculated. For instance, in the case where the first exposure time and the second exposure time are 1 second and 1/8 second, respectively, the pre-exposure is performed at an exposure time which is an eighth of the main exposure, i.e., is divided by the third power of two ($2^3$). Accordingly, at step S110 the average of all the brightness values is multiplied by the third power of two ($2^3$) to calculate the average of all the brightness values when the pre-exposure is performed at the first exposure time (1 second).

At step S111 an exposure compensation factor K is calculated by dividing a predetermined appropriate value (predetermined value) by the average of all the brightness values obtained at step S110. In the case where each data such as pixel data is processed to be expressed by an eight binary digit, since the maximum luminance is 255, the predetermined appropriate value is, e.g., 120, which is roughly half of the maximum luminance. Accordingly, if the average of all the brightness values is 100, the exposure compensation factor K is equal to 120 divided by 100, namely, 1.2 (K=120/100=1.2). At step S112 a third exposure time is calculated by multiplying the first exposure time by the exposure compensation factor K. For instance, if the first exposure time and the exposure compensation factor K are 1 second and 1.2, respectively, the third exposure time is 1.2 seconds.

At step S113, the main exposure is performed at the third exposure time to make the sensitive surface of the CCD image sensor 33 exposed. At step S114, the picture signal obtained at the main exposure is read out of the CCD image sensor 33. At step S115, image processing operations such as an interpolation operation, a color adjusting operation and a gamma control operation are performed in accordance with all the pixel data of the picture signal read out of the CCD image sensor 33 at step S114. These image processing operations are conventional ones known by those skilled in the art, so that the details are not herein discussed. At step S116 image data obtained through the image processing operations performed at step S115 are stored in the memory 40. This completes the photographic operation control routine shown in FIGS. 2 and 3.

As can be understood from the foregoing, in the present embodiment of the digital camera, if the first exposure time, which is calculated in accordance with the photometering value, is longer than a reference time duration (the flash synchronization speed in this particular embodiment), the second exposure time that is shorter than the first exposure time is set to perform the pre-exposure at the second exposure time. Therefore, the time necessary for performing the pre-exposure can be shortened, which makes it possible to reduce the time lag between the pre-exposure and the main exposure. At the same time, electric power consumption necessary to keep holding each of the quick-return mirror, the shutter and the diaphragm of the digital camera at a predetermined position can be reduced, which prolongs the life of the battery.

As a reference time duration with which the first exposure time is compared, a slowest exposure time (e.g., 1/60 second) which can just prevent the image from becoming blurry which is caused by hand movement can be used instead of the flash synchronization speed. Although the aforementioned parameter N is set at 3 or 0 at step S104 or step S105, respectively, the parameter N can be set at any other value which is determined in accordance with the reference time duration so that the calculated second exposure time for the pre-exposure falls within an allowable range. In the illustrated embodiment, although the exposure compensation factor K can be calculated by dividing the predetermined appropriate value by the average of all the brightness values for an entire image, the exposure compensation factor K can be calculated by dividing the predetermined appropriate value by the average of the brightness values for an entire image except for peripheral edge thereof.

In the illustrated embodiment, although the third exposure time is calculated by changing the value of the first exposure time using the exposure compensation factor K (specifically, by multiplying the first exposure time by the exposure compensation factor K), the third exposure time can be calculated by changing the value of the second exposure time. In this case, the exposure compensation factor K is replaced by another exposure compensation factor which is equal to the exposure compensation factor K multiplied by the Nth power of two ($K2^N$).

As can be understood from the foregoing, according to an exposure controller of a digital camera to which the present invention is applied, the time necessary for performing the pre-exposure can be shortened, which makes it possible to reduce the time lag between the pre-exposure and the main exposure.

Furthermore, in the drawings, the quick-return mirror 21 in the pre-exposure and main exposure is shown in the up and down positions, respectively; however, when the quick-return mirror 21 is moved to the up position during the pre-exposure, the quick-return mirror 21 can be maintained in the up position until the main exposure has completed.

In the drawings, the first, second, and third exposure times are the opening and shutting drive speeds of the focal plane shutter; however, the first, second and third exposure times can be set as electronic shutters speeds for the CCD 33, wherein the time for accumulating electric charge is electronically controlled.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An exposure controller of a digital camera, comprising:
   a photometering sensor; and
   a control device; wherein
   said control device calculates a first exposure time in accordance with a photometering value obtained via said photometering sensor;
   said control device calculates a second exposure time shorter than said first exposure time in the case where said first exposure time is longer than a reference time duration;
   said control device performs a pre-exposure in which a sensitive surface of an image pick-up device of said digital camera is exposed at said second exposure time to calculate a brightness value in accordance with a picture signal which is output from said image pick-up device at said pre-exposure; and
   said control device calculates a third exposure time which is to be used at a main exposure, in which said sensitive surface of said image pick-up device is exposed to obtain a picture signal which is to be stored in a memory, by changing the value of one of said first exposure time and said second exposure time in accordance with said calculated brightness value.

2. The exposure controller of a digital camera according to claim 1, wherein said reference time duration is a predetermined flash synchronization speed.

3. The exposure controller of a digital camera according to claim 1, wherein said exposure time is equal to said first exposure time divided by the Nth power of two ($2^N$).

4. The exposure controller of a digital camera according to claim 2, wherein said control device calculates said third exposure time in accordance with an average brightness value of all the pixels of said image pick-up device which are obtained by said pre-exposure.

5. The exposure controller of a digital camera according to claim 4, wherein said third exposure time is calculated by multiplying said second exposure time by an exposure compensation factor;
   wherein said exposure compensation factor is calculated by dividing a predetermined value by said average brightness value, and multiplying the result thereof by the Nth power of two ($2^N$).

6. The exposure controller of a digital camera according to claim 1, wherein said reference time duration is a longest exposure time which can just prevent an image formed on said sensitive surface of said image pick-up device from becoming blurry, caused by hand movement.

7. The exposure controller of a digital camera according to claim 1, wherein said digital camera is an SLR digital camera.

* * * * *